US009817136B2

(12) United States Patent
Moteki et al.

(10) Patent No.: US 9,817,136 B2
(45) Date of Patent: Nov. 14, 2017

(54) RADIATION MONITORING DEVICE (71) Applicant: MITSUBISHI ELECTRIC CORPORATION, Chiyoda-ku, Tokyo (JP)

(72) Inventors: Kenichi Moteki, Tokyo (JP); Masaki Taguchi, Tokyo (JP)

(73) Assignee: MITSUBISHI ELECTRIC CORPORATION, Chiyoda-Ku, Tokyo (JP)

(*) Notice: Subject to any disclaimer, the term of this patent is extended or adjusted under 35 U.S.C. 154(b) by 0 days.

(21) Appl. No.: 15/315,049

(22) PCT Filed: Jun. 9, 2014

(86) PCT No.: PCT/JP2014/065196
§ 371 (c)(1),
(2) Date: Nov. 30, 2016

(87) PCT Pub. No.: WO2015/189887
PCT Pub. Date: Dec. 17, 2015

(65) Prior Publication Data
US 2017/0160404 A1 Jun. 8, 2017

(51) Int. Cl.
*G01T 1/20* (2006.01)
*G01T 1/208* (2006.01)
*G01T 7/00* (2006.01)

(52) U.S. Cl.
CPC ............ *G01T 1/208* (2013.01); *G01T 1/2018* (2013.01); *G01T 7/005* (2013.01)

(58) Field of Classification Search
CPC .......... G01T 1/20; G01T 1/2018; G01T 1/247
See application file for complete search history.

(56) References Cited

U.S. PATENT DOCUMENTS 5,367,168 A * 11/1994 Berthold ................. G01T 1/208
250/362

FOREIGN PATENT DOCUMENTS

JP 63-47285 U 3/1988
JP 63-095376 A 4/1988
(Continued)

OTHER PUBLICATIONS

International Search Report (PCT/ISA/210) dated Jul. 29, 2014, by the Japanese Patent Office as the International Searching Authority for International Application No. PCT/JP2014/065196.

*Primary Examiner* — Kiho Kim
(74) *Attorney, Agent, or Firm* — Buchanan Ingersoll & Rooney PC (57) ABSTRACT

A radiation monitoring device includes: a scintillator emitting fluorescence upon absorption of radiation, a photomultiplier tube converting the fluorescence into an electron pulse, a preamplifier converting the electron pulse into an analog voltage pulse, a pulse amplifier amplifying the analog voltage based on a gain control value, a dose rate measurement part measuring a dose rate based on an output of the pulse amplifier, an average half width measurement part, measuring a half width of a voltage pulse, which is among the outputs of the pulse amplifier and has a wave height larger than a preset value, and processing a predetermined number of measured data on the half widths to calculate a half width deviation, a gain control part receiving the half width deviation from the average half width measurement part, and determining the gain control value using a table, which lists relations between half widths and temperature calibration factors.

7 Claims, 8 Drawing Sheets (56) References Cited

FOREIGN PATENT DOCUMENTS

| JP | 6-258446 A | 9/1994 |
|----|------------|--------|
| JP | 9-211138 A | 8/1997 |
| JP | 9-304542 A | 11/1997 |
| JP | 10-197639 A | 7/1998 |
| JP | 10-221452 A | 8/1998 |
| JP | 2005-077230 A | 3/2005 |

* cited by examiner

| Half Width Deviation | Temperature Calibration Factor (Gain) | Temperature |
|---|---|---|
| +20 (%) | 1.00 | 0°C |
| +18 (%) | 1.00 | 2°C |
| ... | ... | ... |
| 0 (%) | 1.00 | 20°C |
| −2 (%) | 1.00 | 22°C |
| ... | ... | ... |
| −13 (%) | 1.05 | 48°C |
| −14 (%) | 1.06 | 50°C |

RADIATION MONITORING DEVICE

FIELD OF THE INVENTION

This invention relates to a radiation monitoring device, and in particular to a radiation monitoring device which compensates for the temperature characteristics of a wave height, on the basis of a gain control signal.

BACKGROUND

A radiation monitoring device is used for the effluent management of a nuclear reactor facility, a spent fuel reprocessing facility and the like, or the radiation control in the vicinities of those facilities, or the environmental radiometry in the areas adjacent to those facilities. A radiation detector has temperature characteristics, and thereby, the wave height of the radiation, which is detected by the radiation monitoring device, fluctuates in magnitude, corresponding to the change in temperature (see Patent Documents 1-3, for reference). In order to compensate for the temperature fluctuations of the wave height, proposed is a radiation monitor which is equipped with a scintillator, a photo multiplier tube, a radiation detector, a pulse amplifier, an analog to digital convertor, a temperature sensor and a measurement section (for example, Patent Document 4).

The scintillator is equipped with a NaI (Tl) crystal and emits scintillation, if the scintillator detects radiation. The photo multiplier tube converts the scintillation into an electron, amplifies the electron, and outputs a current pulse. The radiation detector contains a preamplifier, and converts the current pulse into an analog voltage pulse to output the analog voltage pulse. The pulse amplifier receives the analog voltage pulse and amplifies it, and further, removes high frequency noises superimposed on the analog voltage pulse. The analog to digital converter receives the amplified analog voltage pulse, converts the wave height of the analog voltage pulse into a digital value, and outputs data on the wave height.

The temperature sensor detects the temperature of the radiation detector and outputs a temperature signal. The measurement section receives the data on the wave heights and the temperature signal, and calculates a dose rate and outputs the dose rate, by performing dose weighing to the data on the wave heights. Furthermore, the measurement section generates a gain control signal and outputs the signal, which is utilized for controlling the gain of the pulse amplifier based on the temperature signal. The wave height of the analog voltage pulse, which is amplified in the pulse amplifier, has fluctuations due to the temperature characteristics of the radiation detector. In the above mentioned radiation monitor, the gain of the pulse amplifier is controlled so that those fluctuations may be compensate for.

Moreover, proposed is a radiation monitor, which is focused on the characteristic of an inorganic scintillator in that the luminescent decay time of the inorganic scintillator becomes smaller with a rise in temperature (for example, Patent Document 5). In replacement of the measurement section, this radiation monitor is equipped with a rise time to temperature conversion section, which receives the output pulse of the radiation detector and measures the temperature of the radiation detector from a rise time. The gain of the pulse amplifier is controlled based on the temperature information from the rise time to temperature conversion section, and the temperature characteristics of the radiation detector are compensated in a similar manner.

CITATION LIST

Patent Literature

Patent Document 1: JP S63-95376 A
Patent Document 2: JP S63-47285 U
Patent Document 3: JP 1110-221452 A
Patent Document 4: JP 2005-77230 A
Patent Document 5: JP H6-258446 A

SUMMARY OF THE INVENTION

Technical Problem

The heat capacity of the radiation detector is remarkably large, compared with that of a temperature sensor. Accordingly, if a system adopts a method in which the temperature characteristics of the radiation detector is compensated by controlling the gain of a pulse amplifier based on the temperature signal from the temperature sensor, there is a case where the function in compensation becomes remarkably less effective. For example, when the outdoor measurement of environmental radiation is performed under solar insolation and the like, or when radioactivity is measured within an institution by employing process fluid as a sample, especially in the case of water monitoring where the measurement of underwater radioactivity is carried out, by sampling water which has a large heat capacity and makes a drastic change in temperature in a short time, a big difference arises in a transient response.

Moreover, in a system which adopts a method of measuring the temperature of a radiation detector from the rise time of an output pulse of the radiation detector, the rise time is short and the wave height varies widely. Thereby, the error in measurement of the rise time is large. As a result, when a temperature is obtained from the rise time in the rise time to temperature conversion section, and the temperature compensation of a wave height is performed, errors of the measurement are highly variable and the compensation errors become large.

Furthermore, a compensatory function may run out of control in both methods, when a noise is injected into the systems. Then, the stability of the methods is insufficient. The present invention is made to solve such a subject and an object of the present invention is to provide a highly precise and highly stable radiation monitoring device, which is capable of making the temperature characteristics of the radiation detector of a radiation monitoring device (or radiation monitor) coincided with the response of the compensation function to the temperature characteristics.

Solution to Problem

A radiation monitoring device in accordance with the present invention includes: a scintillator emitting fluorescence upon absorption of radiation, a photo multiplier tube converting the fluorescence into an electron pulse, a preamplifier converting the electron pulse into an analog voltage pulse, a pulse amplifier amplifying the analog voltage based on a gain control value, a dose rate measurement part measuring a dose rate based on an output of the pulse amplifier, an average half width measurement part, measuring a half width of a voltage pulse, which is among the outputs of the pulse amplifier and has a wave height larger than a preset value, and processing a predetermined number of measured data on the half widths to calculate a half width deviation, a gain control part receiving the half width deviation from the average half width measurement part, and then determining the gain control value using a table, the table listing a relation between half widths and temperature calibration factors.

Advantageous Effects of Invention

The radiation monitoring device according to the present invention can overcome the problem of a big gap which is produced in a transient response and of an error which is generated in temperature compensating. Then, the time response in the temperature characteristics is brought in conformity with that of the compensation characteristics. Further, the radiation monitoring device is capable of securing a high stability and high precision in the radiation measurement.

DESCRIPTION OF EMBODIMENTS

Hereinafter, embodiments of the radiation monitoring device according to the present invention will be explained in detail with reference to the accompanying drawings. It should be noted that the present invention is not limited to the following descriptions but can appropriately be modified within a scope that does not deviate from its spirits.

Embodiment 1

Figure 1:
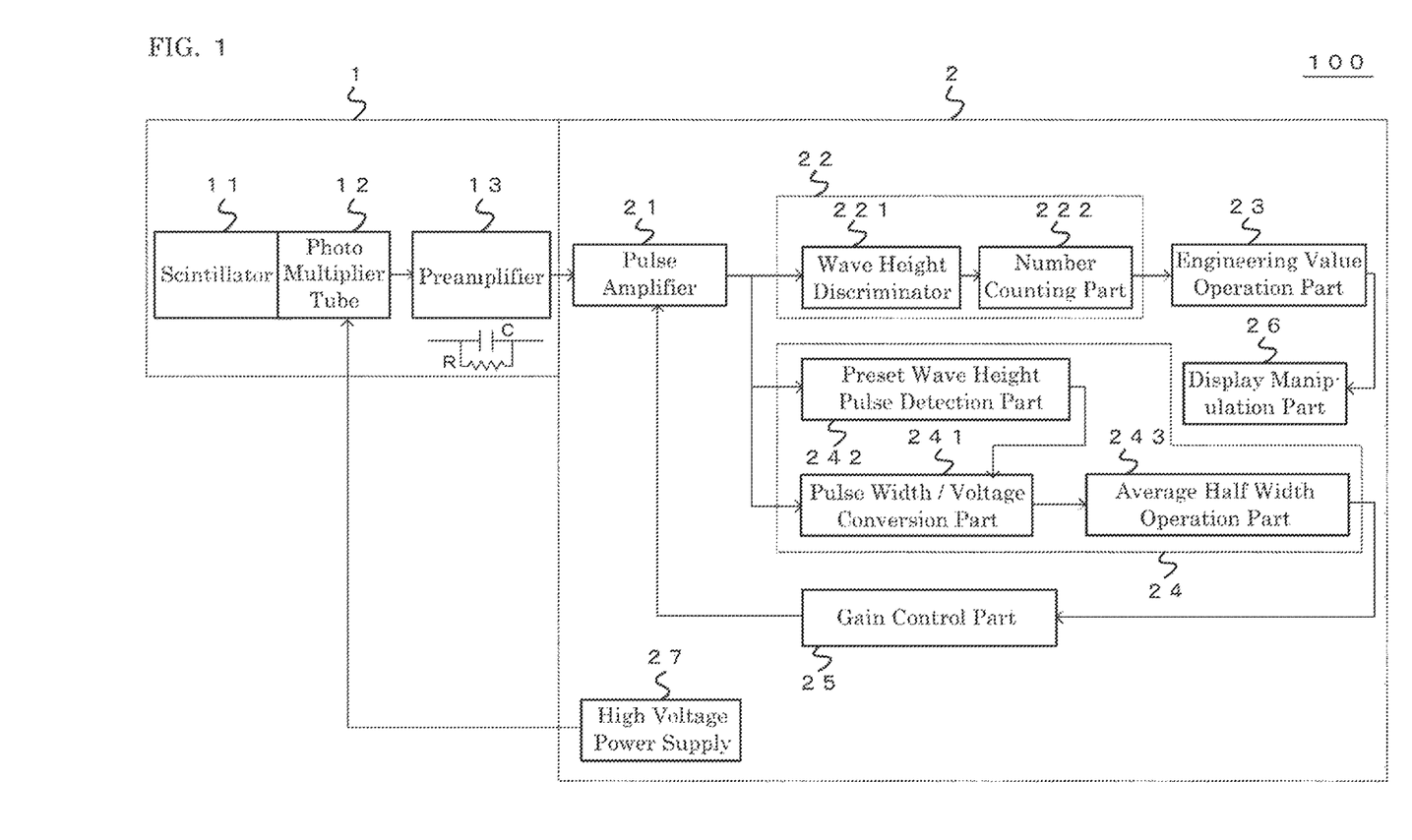
FIG. 1 is a schematic drawing for showing the configuration of a radiation monitoring device in accordance with Embodiment 1.

Hereinafter, Embodiment 1 of the present invention is explained based on the accompanying drawings. FIG. 1 is a block diagram for showing the configuration of a radiation monitoring device 100 in accordance with Embodiment 1. The radiation monitoring device 100 consists of a radiation detector 1 and a measurement unit 2. The radiation detector 1 is equipped with a scintillator 11, a photo multiplier tube (a photo electron multiplier part) 12, and a preamplifier 13. The scintillator 11 includes a NaI (Tl) crystal and will emit fluorescence, when the crystal absorbs radiation. The fluorescence is converted into a current pulse with the photo multiplier tube 12. The photo multiplier tube 12 converts the fluorescence into an electron, and multiplies the electron and outputs the current pulse, when the fluorescence enters. The preamplifier 13 converts the current pulse into an analog voltage pulse and outputs the voltage pulse.

The measurement part 2 is equipped with a pulse amplifier 21, a dose rate measurement part 22, an engineering value operation part 23, an average half width measurement part 24, a gain control part 25, and a display manipulation part 26. The pulse amplifier 21 receives the analog voltage pulse, which is output from the preamplifier 13, and amplifies the pulse based on a gain control value (or gain control signal). In addition, the pulse amplifier 21 removes high frequency noises which are overlapped on the analog voltage pulse. The dose rate measurement part 22 receives the analog voltage pulse amplified on the basis of the gain control value, and measures a dose of the radiation. The engineering value operation part 23 calculates and outputs a radiation dose of per unit time, as an engineering value, based on the dose of the radiation. The dose rate measurement part 22 includes, for example, a wave height discriminator 221 and a number counting part 222.

In order to remove noises of low wave height level, a wave height discrimination level is set in the wave height discriminator 221. The wave height discriminator 221 receives the analog voltage pulse which is amplified in the pulse amplifier 21, and outputs a digital pulse only when the analog voltage pulse is larger than the wave height discrimination level. The number counting part 222 counts the number of the digital pulses at a constant period, and outputs a countable number. The engineering value operation part 23 performs the time constant processing for controlling fluctuations, for example, based on the countable number, and obtains and outputs a counting rate. If in need, the engineering value operation part 23, for example, multiplies the counting rate by a dose rate conversion factor to convert the counting rate to a dose rate and outputs the dose rate.

The average half width measurement part 24 measures a half width of the voltage pulse, which is among the analog voltage pulses amplified with the pulse amplifier 21 and has a wave height higher than a preset value, and obtains an average half width and a half width deviation by move averaging the half widths. A fixed number of data on half widths are used for calculating a moving average of the half widths. Taking into account relations among the deviation (half width deviation) from a standard value of the average half width, the deviation from a standard value in temperature of the radiation detector 1, and the deviation from a standard value of system gains, the gain control part 25 determines a gain control value (or a temperature calibration factor), and outputs a gain control signal to the pulse amplifier 21. The pulse amplifier 21 receives the gain control signal, and changes its gain to compensate for the temperature characteristics of the radiation detector 1.

The deviation of the system gain originates in a temperature deviation, and makes an appearance finally in the wave height of the analog voltage pulse which is the output of the pulse amplifier 21. The gain control value (the temperature calibration factor) is determined in the gain control part 25, in such a manner that the system gain deviation of the pulse amplifier 21 may be cancelled based on the deviation of the average half width, which is obtained in the average half width measurement part 24. The display manipulation part 26 is provided with a display screen. Engineering values which are output from the engineering value operation part 23 are displayed on the display screen. Furthermore, a user performs various setups of the measurement unit 2, looking at this display screen. The high voltage power supply 27 supplies a high voltage for operating the radiation detector 1. The half width deviation which is calculated in the average half width measurement part 24 is transmitted to the gain control part 25 at every fixed cycle.

The average half width measurement part 24 is equipped with a pulse width/voltage conversion part 241, a preset wave height pulse detection part 242, and an average half width operation part 243. The pulse width/voltage conversion part 241 receives the analog voltage pulse which is amplified with the pulse amplifier 21, applies a trigger on a preset wave height level, and converts the pulse width of the preset wave height level into a voltage value. Similarly, the preset wave height pulse detection part 242 receives the analog voltage pulse which is amplified with the pulse amplifier 21, and outputs a one shot pulse to the pulse width/voltage conversion part 241, when the analog voltage pulse is higher than the preset wave height. When the pulse width/voltage conversion part 241 receives the one shot pulse, the pulse width/voltage conversion part outputs a voltage value, as a half width corresponding to the pulse, to the average half width operation part 243, to inform that the pulse width/voltage conversion part accepts an input of the preset wave height.

Figure 2:
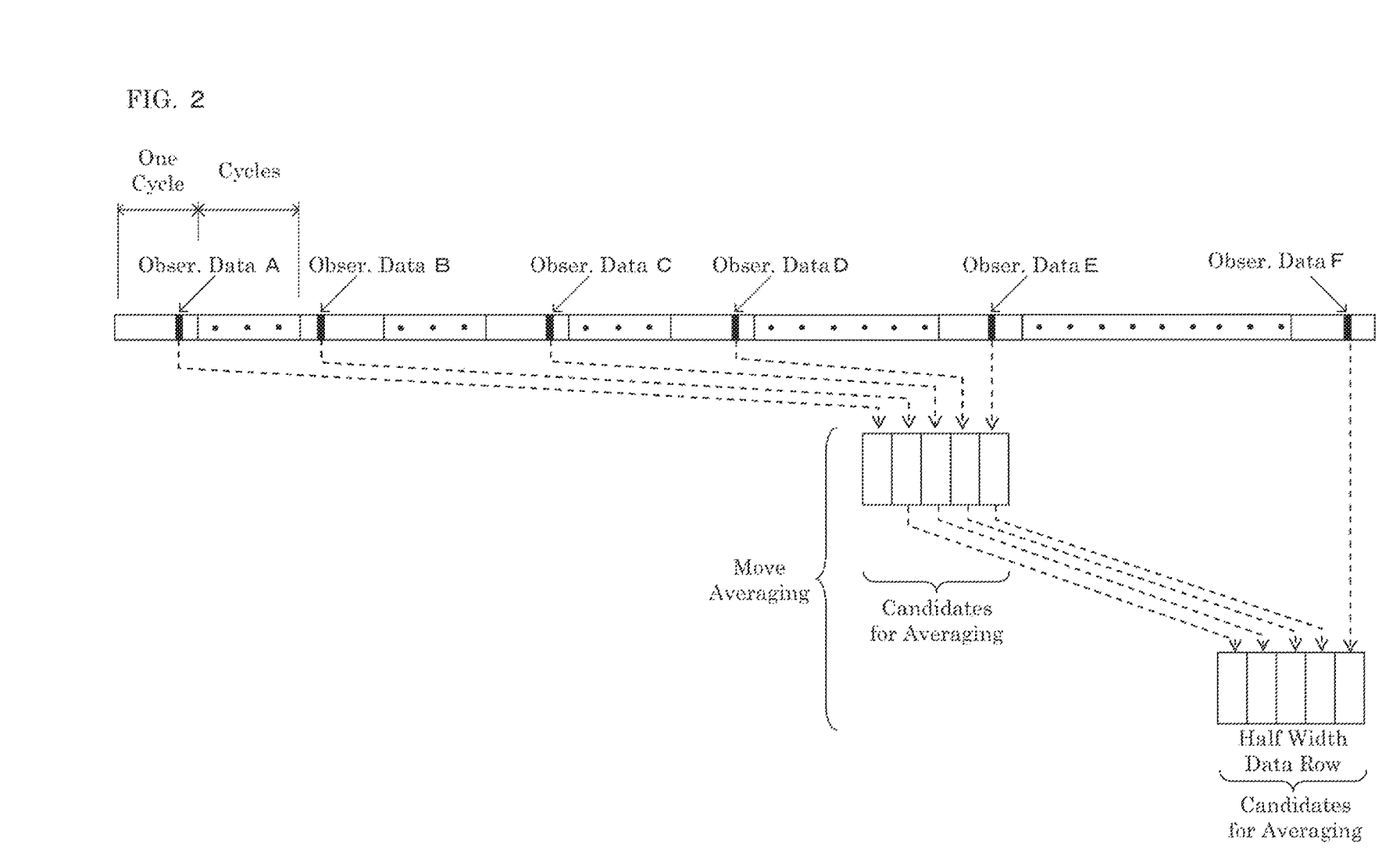
FIG. 2 is a schematic drawing for showing the relation between a half width data row and the data update of a constant period, according to Embodiment 1.

Operation of observational data is carried out at a constant period. If an observational datum is supposed to be measured at a certain time, two or more constant periods will proceeds, by the time when the following observational datum is measured. Elapsed time in the meantime is usually so short that the change in temperature can be disregarded. The average half width operation part 243 holds a half width data row, which includes measured half widths arranged in chronological order, and confirms the presence or absence of the data input of a half width at a constant frequency. FIG. 2 shows an example of the half width data row concerning voltage pulses, which have a height larger than the preset wave height. The half width data row includes a preset number of data on the half width, where half widths are arranged in reversed time series from the latest to the oldest. Here, the number of the data, which is to be preset in the half width data row, is made to be 5.

The average half width operation part 243 deletes an oldest datum in chronological order from the half width data row which includes the preset number of data, and adds a current datum in the order of inputting. Further, the average half width operation part calculates an average half width and a half width deviation based on the updated half width data row and outputs them. It is shown in the drawing how Observational Data A to Observational Data F are taken into a half width data row by move averaging. At first, Observational Data A to Observational Data E are taken in, as a half width data row for move averaging. After that, when Observational Data F are measured, Observational Data A are discarded and the update of the half width data row is performed. Observational Data B to F are taken into a most current half width data row, as candidates for move averaging.

Figure 3:
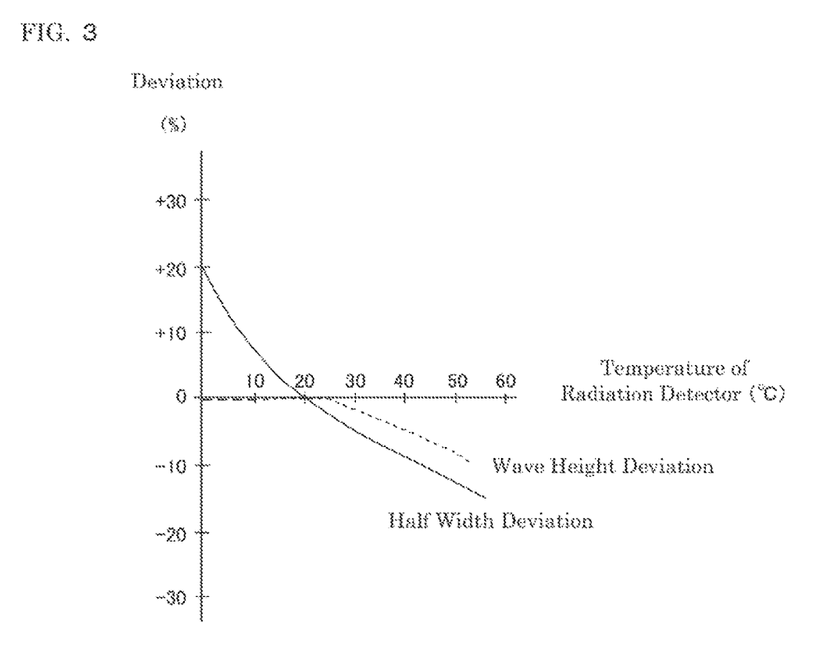
FIG. 3 is a schematic drawing for showing the temperature dependency of the wave height and half width of a voltage pulse, which is generated in the output of a pulse amplifier due to the temperature characteristics of a radiation detector.

FIG. 3 shows a wave height deviation from a standard value of analog voltage pulses and a half width deviation from a standard value of the analog voltage pulses, which are produced in the output of the pulse amplifier 21 due to the temperature characteristics of the radiation detector 1. In the two graphs, shown are the deviation of the average wave heights to the temperature when 20° C. is employed as a standard temperature, and the deviation of the average half widths to the temperature when 20° C. is employed as a standard temperature. The half width deviation becomes smaller as the temperature becomes higher. On the contrary, the wave height deviation is flat in general at 0-20° C., and becomes smaller as the temperature becomes higher, at 20° C. or more. The drawing shows that a wave height deviation is uniquely decided to a half width deviation.

Figure 4:
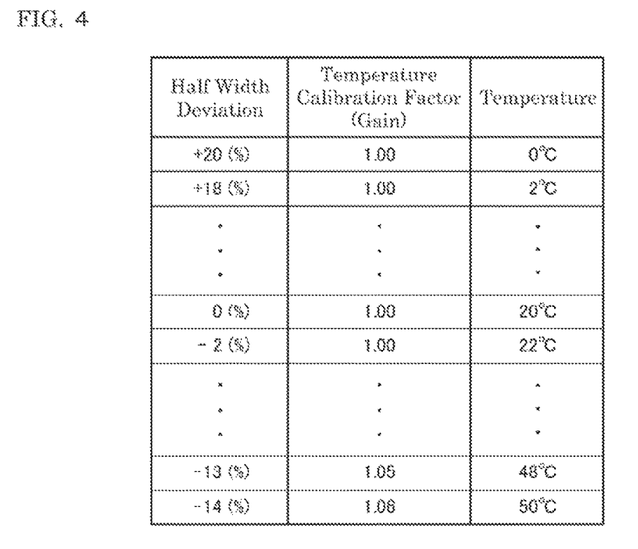
FIG. 4 is a drawing for showing a table listing the relation of gain compensation amount, corresponding to the half width deviations in the pulse amplifier.

From these observed data, it is possible to obtain a temperature calibration factor (or a temperature correction coefficient) corresponding to the half width deviation. FIG. 4 is a table for showing the temperature dependencies of the half width deviation and the temperature calibration factor. The gain control part 25 receives an average half width data at a constant period from the average half width operation part 243, and determines a gain control value (temperature calibration factor), in reference to the table, which list the half width deviations and the temperature calibration factors, shown in FIG. 4, and outputs a gain control signal. The pulse amplifier 21 controls its gain based on the gain control signal.

Figure 5:
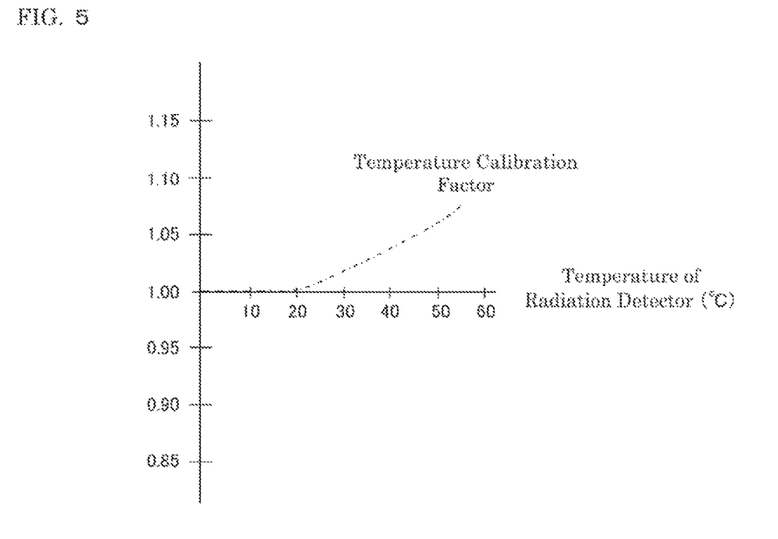
FIG. 5 is a schematic drawing for showing the relation between the gain compensation amount and the temperature of the pulse amplifier.
Figure 6:
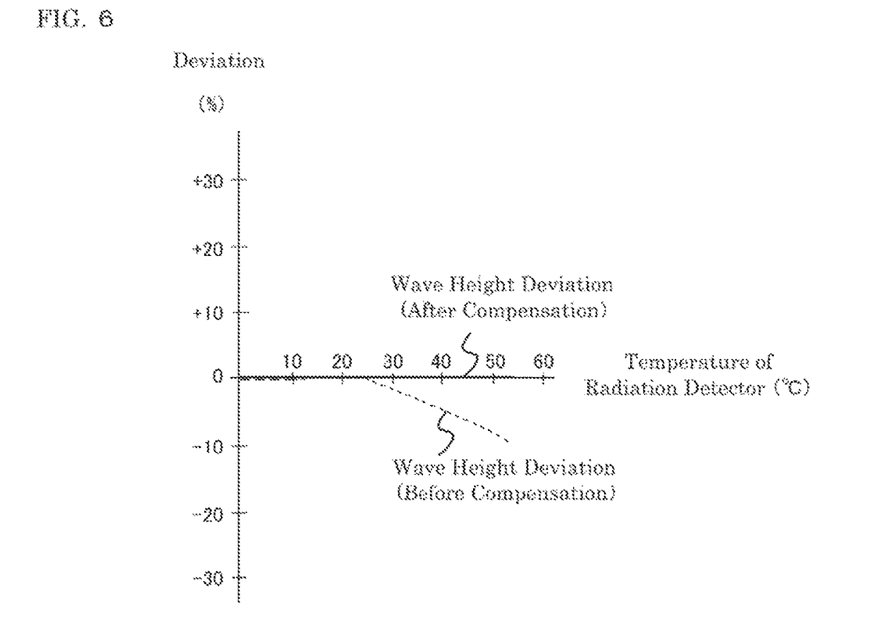
FIG. 6 is a schematic drawing for showing the temperature dependency of a wave height deviation before the compensation and a wave height deviation after the compensation.

FIG. 5 is a drawing for showing the temperature dependency of the temperature calibration factor (or temperature correction coefficient). The temperature calibration factor of the radiation detector 1 is equal to 1 at 0° C. to 20° C., and increases gradually from 20° C. In use of these temperature calibration factors, the pulse amplifier 21 performs gain compensation so that a wave height deviation may be canceled. FIG. 6 shows the temperature dependencies of the wave height deviations before the compensation, and the wave height deviations after the compensation. It is shown in the drawing that the wave height deviation becomes flat over a wide range of temperature after the gain compensation.

The preamplifier 13 of the radiation detector 1 is equipped with a capacitor C which accumulates an electric charge and a resistance R which discharges the electric charge accumulated. As for an analog voltage pulse which is output from the preamplifier 13, the rise time and the fall time of the pulse are dominated by a circuit time constant CR and a decay time τ of the fluorescence in the scintillator 11. Here, the circuit time constant CR is determined by the capacitor C and the resistance R. In the case of circuit time constant CR>decay time τ, the rise time depends on the decay time τ and the fall time depends on the circuit time constant CR. In this case, a wave height relatively larger than the case of circuit time constant CR<decay time τ is obtained. The pulse width becomes longer, and thereby, linearity is low at a high counting rate. In the case of circuit time constant CR<decay time τ, the rise time depends on the circuit time constant CR and the fall time depends on the decay time τ. Although the wave height becomes relatively lower than the case of circuit time constant CR>decay time τ, the pulse width becomes short. Thereby, the linearity at a high counting rate is high.

Generally speaking, as an upper limit of the counting rate in the radiation measurement, $1 \times 10^7$ cpm or so are desirable. If the circuit time constant CR and the decay time τ are made roughly equivalent, suitable characteristics are obtained in which the wave height and the high counting rate are balanced. When the circuit time constant CR and the decay time τ are roughly equivalent, the decay time of the scintillator will relate to both the rise and the decay of a pulse. Since the correlation between the decay time and the temperature of a scintillator is taken over to the correlation of the half width and the temperature, suitable temperature compensating can be realized by measuring a half width.

As the radiation monitoring device according to the present invention is made to compensate for the temperature characteristics of the radiation detector based on the good correlation between the temperature and the half width of the radiation detection pulse signal of the radiation detector 1, compensation with good accuracy can be achieved. Time responses in the temperature characteristics and the compensation characteristics can be made to be coincided, and thereby, the radiation monitoring device is capable of generating a stabilized and high accuracy output. In the system which carries out the control of gains of a pulse amplifier by the temperature signal of the temperature sensor and compensates the temperature characteristics of a radiation detector, a big gap should arise in each transient response and an error is generated in temperature compensating, due to the difference in heat capacity between a temperature sensor and a scintillator which constitutes a radiation detector. The radiation monitoring device in accordance with the present embodiment is capable of resolving these shortcomings.

Embodiment 2

In Embodiment 1, the average half width measurement part 24 set a wave height for measuring the half width at an arbitrary energy position of the background spectrum where the counting rate is comparatively high. In Embodiment 2, it is determined that a peak wave height corresponding to gamma ray energy 1461 keV of K–40, which is contained in the components which constitute a radiation detector, is set as a wave height of the half width measurement.

Figure 7:
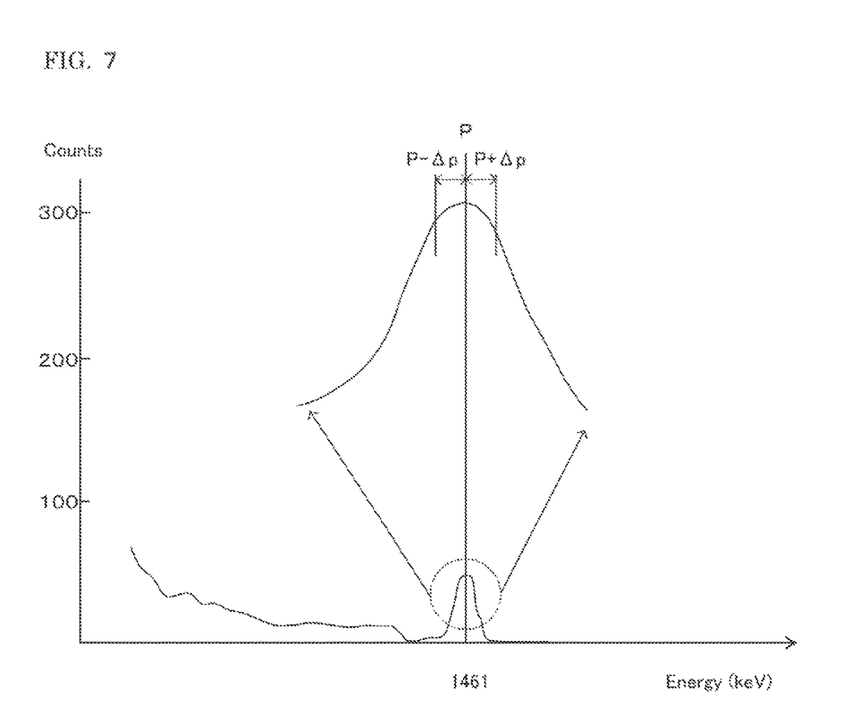
FIG. 7 is a schematic drawing for showing the peak wave height and window widths corresponding to a gamma ray of K-40.

FIG. 7 shows a current pulse which is output from the photo multiplier tube 12. The spectrum to be measured includes a peak spectrum from a gamma ray (K–40), in addition to the background spectrum. The peak spectrum in a circle shows the peak position of 1461 keV (gamma ray energy). In the peak spectrum, P–$\Delta$P shows the lower limit of a wave height in the half width measurement, and P+$\Delta$P shows the upper limit of a wave height in the half width measurement. For example, a countable number, as large as one count or so, is acquired in a minute at this range, when it is assumed that ±$\Delta$P/P=0.05. Move averaging for 5 minutes or so leads to the acquisition of a high precision average half width, and thereby, the temperature compensating where the accuracy is highly stabilized can be performed.

Embodiment 3

Figure 8:
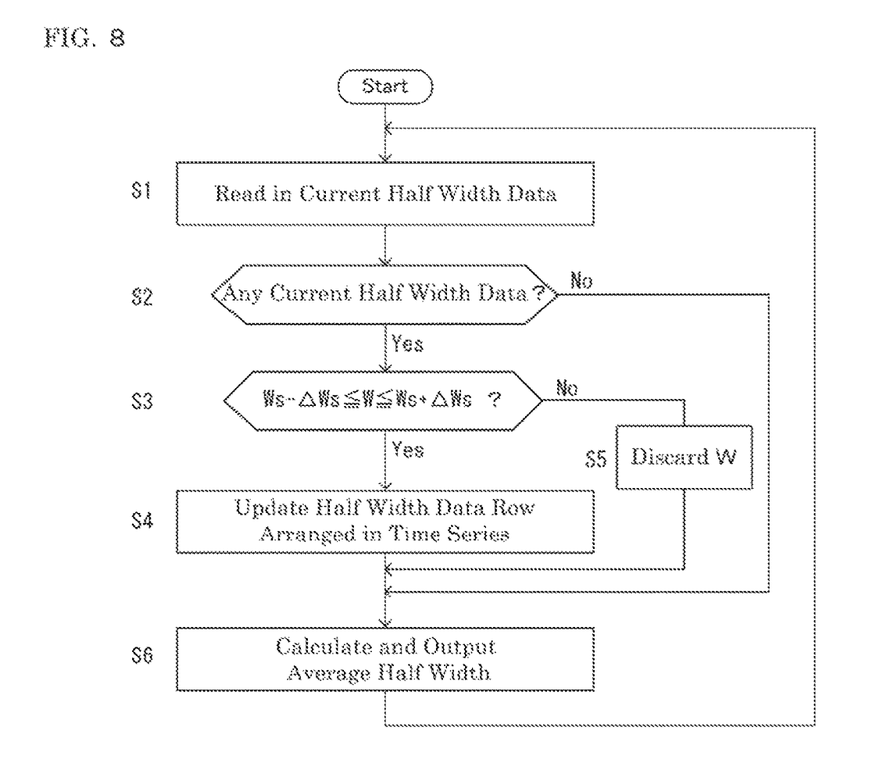
FIG. 8 is a schematic drawing for showing a noise invasion judgement and the process flow at the time of noise invasion, in accordance with Embodiment 3.

According to Embodiment 3, at the average half width operation part 243 of the average half width measurement part 24, it is judged whether each of the half widths W of the input pulses which fulfill the wave height conditions is within a permissible range ±$\Delta$Ws of a standard value Ws or not. When it is judged that a half width W is deviated from the permissible range, the half width of the received voltage pulse is considered to be a noise. Data concerning the half width are discarded, and thereby, the influence of a noise is eliminated. In other words, the average half width measurement part 24 will discard the half width data at a this time operation cycle, if the ratio of the average half width of this time operation cycle to the average half width of previous time operation cycle deviates from the preset permissible range. When new half width data, which outputs the average half width at the previous time operation cycle, deviate from the permissible range, the average half width measurement part 24 will output the average half width of previous time operation cycle.

FIG. 8 shows the procedure in this embodiment. In step S1 a new half width W is read in, and in step S2 it is judged whether there is any other new half width data or not. If the judgment is NO, the process progresses to step S6 and an average half width and a half width deviation are calculated using the previous time half width data row. The calculated result is sent to the gain control part 25 as an output, or the process returns to step S1. If the judgment is YES, it is judged whether the expression Ws–$\Delta$Ws≤W≤Ws+$\Delta$Ws is satisfied or not in step S3. If the judgment is YES, the half width data row, which are arranged in time series, will be updated in step S4, and the process progresses to step S6. If the judgment is NO, the data concerning the new half width will be discarded in step S5, and the process will progress to step S6. An average half width and a half width deviation are calculated using the previous time half width data row, instead of using the latest half width data, or the process returns to step S1 after discarding the data concerning the new half width. An average half width and a half width deviation are calculated, and the calculated result is sent to the gain control part 25 as an output in step S6, and the process returns to step S1.

Among electromagnetism noises which propagate through empty space, it is an electromagnetic wave of 10 MHz or more, a frequency higher than a detector signal pulse, that has an influence on the measurement. Noises which are injected from a grounding line or a power supply line are at a lower frequency than that of a detector signal pulse. According to the radiation monitoring device in accordance with Embodiment 3 of the present invention, more reliable temperature compensating can be performed, by arranging a permissible range in the half width, identifying noises and eliminating the noises.

Embodiment 4

Figure 9:
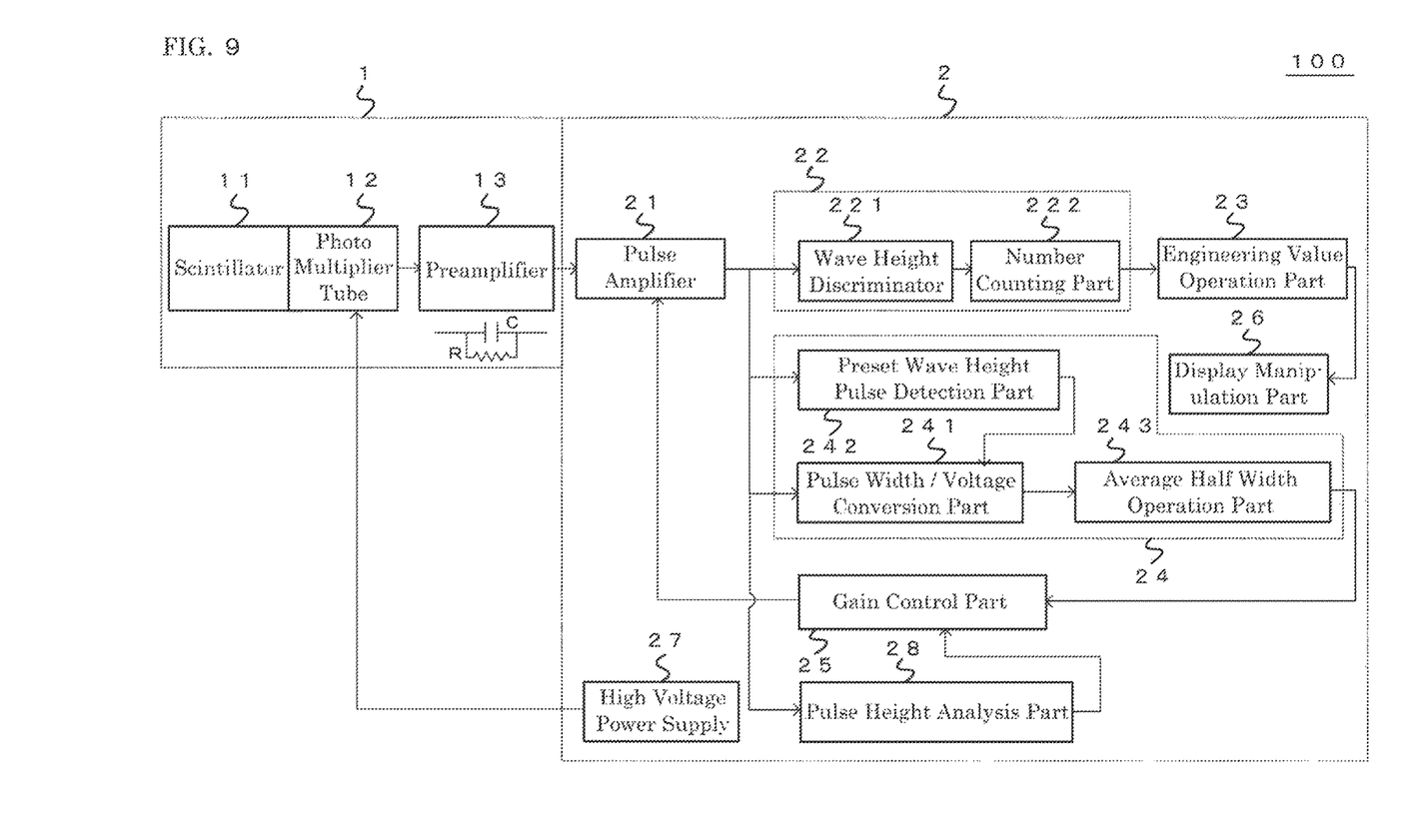
FIG. 9 is a schematic drawing for showing the configuration of a radiation monitoring device, in accordance with Embodiment 4.

In Embodiment 1, a temperature calibration factor is determined at the gain control part 25, based on the half width deviation of the average half width operation part 243. The temperature calibration factor acts on the gain of the pulse amplifier 21, and the temperature characteristics of the radiation detector 1 are compensated. In Embodiment 4, the measurement unit 2 is equipped with a pulse height analysis part 28, as shown in FIG. 9. The pulse height analysis part 28 receives an analog voltage pulse which is amplified at the pulse amplifier 21, and analyzes the wave height, and obtains the peak wave height position of a gamma ray (1461 keV) from K–40, which is contained in the components such as glasses and others of the scintillator 11 and the photo multiplier tube 12, which constitute the radiation detector 1.

Based on the deviation of the ratio of an obtained peak wave height position to a reference position (1461 keV), the gain control part 25 determines a drift compensation coefficient, and calculates a gain control value, which is determined by multiplying a temperature calibration factor (gain control value for temperature compensating) by the drift compensation coefficient. A gain control signal is output from the gain control part 25. The gain control signal acts on the gain of the pulse amplifier 21, and the change with the passage of time at the radiation detector 1 is made to be compensated. Because the change (drift) at the radiation detector 1 transitions slowly with the passage of time, the calibration of the peak wave height position is performed at a constant period, for example, once a day, on a determined time of day.

As mentioned above, the radiation monitoring device according to the present embodiment compensates for the temperature characteristics of the radiation detector 1. Furthermore, the radiation monitoring device makes the drift compensation at the pulse height analysis part 28 with a moderate interval so that the peak wave height position of a gamma ray 1461 keV of K-40 may become constant. The gamma ray is contained in the component parts of the radiation detector 1. The wave height position, where half widths are measured, is made to be stabilized. Accordingly, the radiation monitoring device can perform the reliable and stable temperature compensation.

It should be noted that each embodiment of the present invention may be freely combined, or appropriately modified or omitted within the spirit and scope of the invention.

EXPLANATION OF NUMERALS AND SYMBOLS

1 Radiation Detector; 11 Scintillator; 12 Photo Multiplier Tube;
13 Preamplifier; 2 Measurement Unit; 21 Pulse Amplifier;
22 Dose Rate Measurement Part; 221 Wave Height Discriminator;
222 Number Counting Part; 23 Engineering Value Operation Part;
24 Average Half Width Measurement Part;
241 Pulse Width/Voltage Conversion Part;
242 Preset Wave Height Pulse Detection Part,
243 Average Half Width Operation Part; 25 Gain Control Part;
26 Display Manipulation Part; 27 High Voltage Power Supply;
28 Pulse Height Analysis Part; 100 Radiation Monitoring Device

What is claimed is:
1. A radiation monitoring device comprising:
a scintillator emitting fluorescence upon absorption of radiation,
a photo multiplier tube converting the fluorescence into an electron pulse,
a preamplifier converting the electron pulse into an analog voltage pulse,
a pulse amplifier amplifying the analog voltage based on a gain control value,
a pulse counter to measure a dose rate based on an output of the pulse amplifier,
a voltage detector to measure a half width of a voltage pulse, which is among the outputs of the pulse amplifier and has a wave height larger than a preset value, and processing a predetermined number of measured data on the half widths to obtain an average half width, and further to calculate a half width deviation from the average half width and a standard value,
a controller configured to receive the half width deviation from the voltage detector, and then determine the gain control value using a table, the table listing a relation between half widths and temperature calibration factors.

2. The radiation monitoring device as set forth in claim 1, wherein the voltage detector holds a half width data row which includes measured half widths of voltage pulses having a wave height larger than a preset value, the half widths arranged in time series, and updates the half width data row every time when the voltage detector measures a half width of a voltage pulse having a wave height larger than a preset value.

3. The radiation monitoring device as set forth in claim 2, wherein the voltage detector obtains the half width deviation by move averaging in the use of the half width data row.

4. The radiation monitoring device as set forth in claim 3, wherein the voltage detector judges whether a half width measured at a latest cycle is deviated from a permissible range or not, and discards the half width measured at a latest cycle when the voltage detector judges that the half width measured at the latest cycle is out of the permissible range.

5. The radiation monitoring device as set forth in claim 3, further comprising an analyzer to analyze the output of the pulse amplifier and obtains a peak wave height position which corresponds to 1461 keV, and determining a drift compensation coefficient from the obtained peak wave height position and a reference position of a gamma ray.

6. The radiation monitoring device as set forth in claim 5, wherein the controller receives the half width deviation from the voltage detector and then reads in a temperature calibration factor which corresponds to the received half width deviation from the table, and determines the gain control value from the temperature calibration factor which is read in and a drift compensation coefficient which is output from the analyzer.

7. The radiation monitoring device as set forth in claim 1, wherein the voltage pulse having a wave height larger than a preset value corresponds to 1461 keV.

* * * * *